(12) United States Patent
Zhan et al.

(10) Patent No.: US 11,867,055 B2
(45) Date of Patent: Jan. 9, 2024

(54) METHOD AND SYSTEM FOR CONSTRUCTION OF ARTIFICIAL INTELLIGENCE MODEL USING ON-CUTTER SENSING DATA FOR PREDICTING WELL BIT PERFORMANCE

(71) Applicant: SAUDI ARABIAN OIL COMPANY, Dhahran (SA)

(72) Inventors: Guodong Zhan, Dhahran (SA); Arturo Magana-Mora, Dhahran (SA); Timothy Eric Moellendick, Dhahran (SA); Chinthaka P. Gooneratne, Dhahran (SA); Jianhui Xu, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 128 days.

(21) Appl. No.: 17/643,194

(22) Filed: Dec. 8, 2021

(65) Prior Publication Data

US 2023/0175394 A1 Jun. 8, 2023

(51) Int. Cl.
*E21B 49/00* (2006.01)
*G05B 13/02* (2006.01)

(52) U.S. Cl.
CPC .......... *E21B 49/003* (2013.01); *G05B 13/027* (2013.01); *E21B 2200/20* (2020.05)

(58) Field of Classification Search
CPC .... E21B 2200/20; E21B 49/003; E21B 47/01; E21B 47/017; E21B 47/013
See application file for complete search history.

(56) References Cited

U.S. PATENT DOCUMENTS

| | | | |
|---|---|---|---|
| 6,732,052 | B2 | 5/2004 | Macdonald et al. |
| 9,598,947 | B2 | 3/2017 | Wang et al. |
| 9,970,266 | B2 | 5/2018 | Marx et al. |
| 10,267,138 | B2 | 4/2019 | Samuel et al. |

(Continued)

FOREIGN PATENT DOCUMENTS

| | | |
|---|---|---|
| CA | 2577031 C | 5/2012 |
| CN | 111520123 B | 3/2021 |

(Continued)

OTHER PUBLICATIONS

S. Glubokovskikh et al. "Machine Learning Algorithms for Real-time Prediction of the Sonic Logs Based on Drilling Parameters and Downhole Accelerometers" SEG Technical Program Expanded Abstracts; Sep. 25, 2020 (6 pages).

(Continued)

*Primary Examiner* — Kristyn A Hall
(74) *Attorney, Agent, or Firm* — Osha Bergman Watanabe & Burton LLP

(57) ABSTRACT

A system having an instrumented cutter of a drill bit including an on-cutter sensor for monitoring drilling performance metrics while performing drilling operations based on offset (Continued)

well data and a computing device is disclosed. The computing device executes a model development system configured to use the drilling performance metrics, surface drilling parameters, and characteristics of the instrumented cutter to train a machine learning (ML) model. The trained ML model is used to optimize drilling parameters and predict drill bit performance in a current well.

14 Claims, 7 Drawing Sheets

(56) References Cited

U.S. PATENT DOCUMENTS

| | | | |
|---|---|---|---|
| 11,066,917 B2 | 7/2021 | Jain et al. | |
| 2013/0068525 A1* | 3/2013 | DiGiovanni | E21B 10/567 29/592.1 |
| 2015/0226052 A1* | 8/2015 | Samuel | E21B 47/022 700/275 |
| 2019/0048703 A1 | 2/2019 | Samuel et al. | |
| 2019/0345809 A1* | 11/2019 | Jain | E21B 47/26 |
| 2021/0017847 A1 | 1/2021 | Aragall et al. | |
| 2021/0404315 A1* | 12/2021 | Parak | G06N 5/01 |

FOREIGN PATENT DOCUMENTS

| | | |
|---|---|---|
| RU | 2723805 C1 | 6/2020 |
| WO | 2021046385 A1 | 3/2021 |
| WO | 2021119306 A1 | 6/2021 |

OTHER PUBLICATIONS

P. Ashok et al. "Drill Bit Failure Forensics Using 2d Bit Images Captured at the Rig Site" SPE/IADC International Drilling Conference and Exhibition 2021: SPE-204124-MS; Mar. 8, 2021 (13 pages).

S. Cornel et al. "Use of Big Data and Machine Learning to Optimise Operational Performance and Drill Bit Design" SPE Asia Pacific Oil & Gas Conference and Exhibition 2020: SPE-202243-MS; Nov. 12, 2020 (15 pages).

P. Batruny et al. "Drilling in the Digital Age: Machine Learning Assisted Bit Selection and Optimization" International Petroleum Technology Conference 2021: IPTC-21299-MS; Mar. 16, 2021 (11 pages).

T. R. Salakhov et al. "An Expert System Approach to Real-time Diagnosis of Drill Bit Condition and Preventing Its Damage" SPE Oil and Gas India Conference and Exhibition 2010: SPE-127371-MS; Jan. 20, 2010 (6 pages).

* cited by examiner

METHOD AND SYSTEM FOR CONSTRUCTION OF ARTIFICIAL INTELLIGENCE MODEL USING ON-CUTTER SENSING DATA FOR PREDICTING WELL BIT PERFORMANCE

BACKGROUND

Drilling a borehole to penetrate a hydrocarbon reservoir is a critical procedure in discovering, evaluating and producing oil and gas. It is common practice to extend the length a borehole by causing a drill bit to rotate while in contact with the rock at the bottom of the borehole. The drill bit typically consists of a plurality of cutters embedded in a plurality of blades arranged over the surface of the drill bit. During drilling the cutters become worn and their efficiency in extending the length of the borehole becomes diminished. Replacing the drill bit is time consuming and expensive and consequently it is undesirable to replace the drill bit sooner or more frequently than essential.

Thus, it is advantageous to have means of monitoring the wear of the cutters and the ability to correlate the wear and rate of wear of the cutters with other drilling parameters. This knowledge may be used to modify the drilling parameters during drilling and to modify the design and construction of future drill bits.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system including an instrumented cutter of a drill bit comprising an on-cutter sensor for monitoring drilling performance metrics while performing drilling operations based on offset well data, and a computing device. The computing device executes a model development system configured to use the drilling performance metrics, surface drilling parameters, and characteristics of the instrumented cutter to train a machine learning (ML) model. The trained ML model is used to optimize drilling parameters and predict drill bit performance in a current well.

In general, in one aspect, embodiments disclosed herein relate to a method, involving measuring drilling performance metrics while performing drilling operations in an offset well using an instrumented cutter of a drill bit comprising an on-cutter sensor, transmitting the drilling performance metrics to a computing device, training a machine learning (ML) model hosted by the computing device using processed drilling performance metrics, surface drilling parameters, and characteristics of the instrumented cutter to obtain a trained ML model, and using the trained ML model to optimize the surface drilling parameters and predict drill bit performance while performing drilling operations in a current well.

In general, in one aspect, embodiments disclosed herein relate to a non-transitory computer readable medium comprising software instructions, that when executed, perform a method involving measuring drilling performance metrics while performing drilling operations in an offset well using an instrumented cutter of a drill bit comprising an on-cutter sensor, transmitting the drilling performance metrics to a computing device, training a machine learning (ML) model hosted by the computing device using processed drilling performance metrics, surface drilling parameters, and characteristics of the instrumented cutter to obtain a trained ML model, and using the trained ML model to optimize the surface drilling parameters and predict drill bit performance while performing drilling operations in the offset well.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
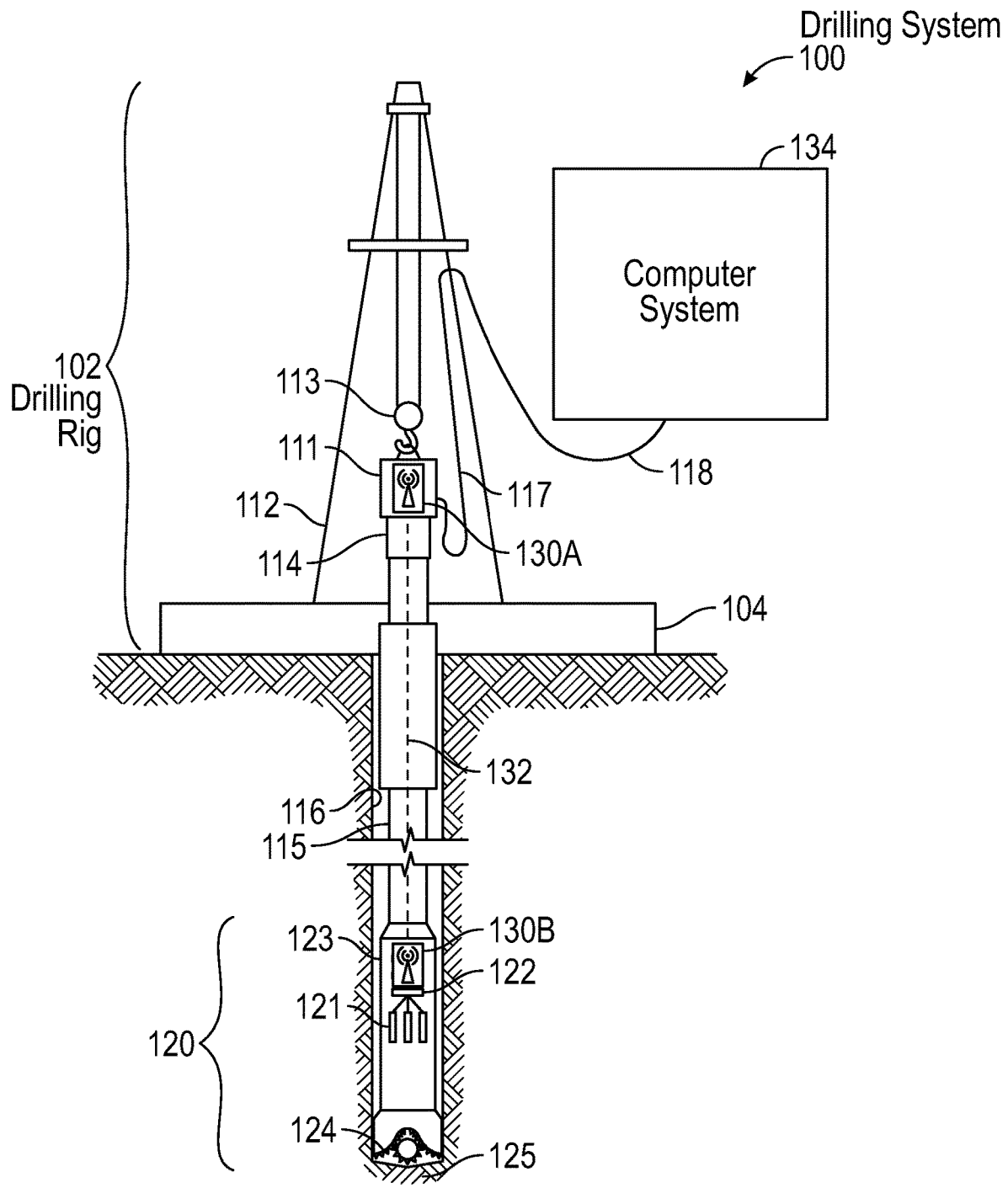
FIG. 1 shows system, in according with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a sensing logging method for monitoring the real-time condition of the PDC cutters in the drill bit by forming an intelligent logging system inside PDC cutter substrates through measuring electrical, capacitive, acoustic, magnetic or other field properties. Data from the sensors may be transferred to the data processing system for drilling optimization and drilling automation. The on-cutter sensing technology of the instrumented PDC cutter has the ability to measure individual PDC cutter wear conditions that permit more accurate correlation of PDC cutter damage reduction to specific bit features and improving iterative improvements.

Embodiments disclosed herein also aid in predicting bit performance based on the measurements that may be used to tailor drilling automation algorithms to optimize drilling performance based on current cutter/bit condition. In one or more embodiments, the sensing data collected from the on-cutter sensors for similar intervals of offset wells (i.e., existing wellbores close to a proposed well that provides information for planning the proposed well) is integrated as a training set for deriving artificial intelligence (AI) models, including machine-learning (ML) and deep-learning (DL) models, to predict drill bit performance, bit dull grade, and bit life based on offset historical wells. Since the sensors are incorporated into the PDC cutter substrate and connected to the drill bit, the real-time PDC cutter and drill bit condition signals will be collected and processed by data-driven models. Data from the sensors are transferred to the data processing system for drilling optimization and drilling automation. Data domain transformations (e.g., Fast Fourier Transform) are used to process data in order to discriminate the relevant signals from noises, and to identify relevant signals to increase ML model performance. The characteristics of the PDC cutters are correlated with temperature, vibration, wear resistance, as well as with the surface drilling parameters (i.e., weight on bit—WOB, drilling mud rate, among others) to provide a complete set of information on the properties of the PDC cutter cutting elements (i.e., diamond table). The in-situ property information of the PDC cutter cutting elements and substrates is also used for optimizing the drilling parameters for each specific interval in offset wells. These results provide further guidance for the offset well optimization of the drilling process, such as adjustment of revolutions per minute (RPM), WOB, drilling mud rate, etc.

FIG. 1 illustrates a drilling system (100) which may include a top drive drill rig (110) arranged around the setup of a drill bit logging tool (120). A top drive drill rig (110) may include a top drive (111) that may be suspended in a derrick (112) by a travelling block (113). In the center of the top drive (111), a drive shaft (114) may be coupled to a top pipe of a drillstring (115), for example, by threads. The top drive (111) may rotate the drive shaft (114), so that the drillstring (115), a drill bit logging tool (120), and a drill bit (124) cut the rock formation (125) at the bottom of a borehole (116). A power cable (117) supplying electric power to the top drive (111) may be protected inside one or more service loops (118) coupled to a control system (134). As such, drilling mud may be pumped into the borehole (116) through a mud line, the drive shaft (114), and/or the drillstring (115).

Moreover, when completing a well, casing may be inserted into the borehole (116). The sides of the borehole (116) may require support, and thus the casing may be used for supporting the sides of the borehole (116). As such, a space between the casing and the untreated sides of the borehole (116) may be cemented to hold the casing in place. The cement may be forced through a lower end of the casing and into an annulus between the casing and a wall of the borehole (116).

As further shown in FIG. 1, sensors (121) may be included in a bottomhole assembly "BHA" (123), which is positioned adjacent to a drill bit (124) and coupled to the drill string (115). Sensors (121) may also be coupled to a processor assembly (122) that includes a processor, memory, and an analog-to-digital converter for processing sensor measurements. For example, the sensors (121) may include acoustic sensors, such as accelerometers, measurement microphones, contact microphones, and hydrophones. Likewise, the sensors (121) may include other types of sensors, such as transmitters and receivers to measure resistivity, gamma ray detectors, etc. The sensors (121) may include hardware and/or software for generating different types of well logs (such as acoustic logs or density logs) that may provide well data about a borehole (116), including porosity of borehole sections, gas saturation, bed boundaries in a geologic formation, fractures in the borehole or completion cement, and many other pieces of information about a formation. If such well data is acquired during drilling operations (i.e., logging-while-drilling), then the information may be used to make adjustments to drilling operations in real-time. Such adjustments may include altering weight on bit (WOB), drilling direction, mud weight, torque on bit, and many others drilling parameters.

In accordance with one or more embodiments, a telemetry transceiver (130B) may be installed in the BHA (123) of a drilling system (100) to transmit data and signals through a telemetry channel (132) from the BHA (123) to a telemetry transceiver (130A) located on the drilling rig (102). The telemetry channel (132) may use acoustic signals transmitted through the drilling fluid. In other embodiments, the telemetry channel (132) may use electromagnetic signals transmitted through wired drill pipe. In other embodiments, the telemetry channel (132) may use electromagnetic signals transmitted through the geologic formations to the transceiver (130A) at the Earth's surface (104). The data and signals transmitted through the telemetry channel (132) may be processed and analyzed to determine by a computer system (134). The computer system (134) may be located on the drilling rig (102) or at a remote location.

The computer system (134) may be coupled to the drilling rig (102) in order to perform various functions for extending the length of the borehole (116), such as changing the rotational speed of the drill bit (124) and changing the force applied to the drill bit (124).

Figure 2:
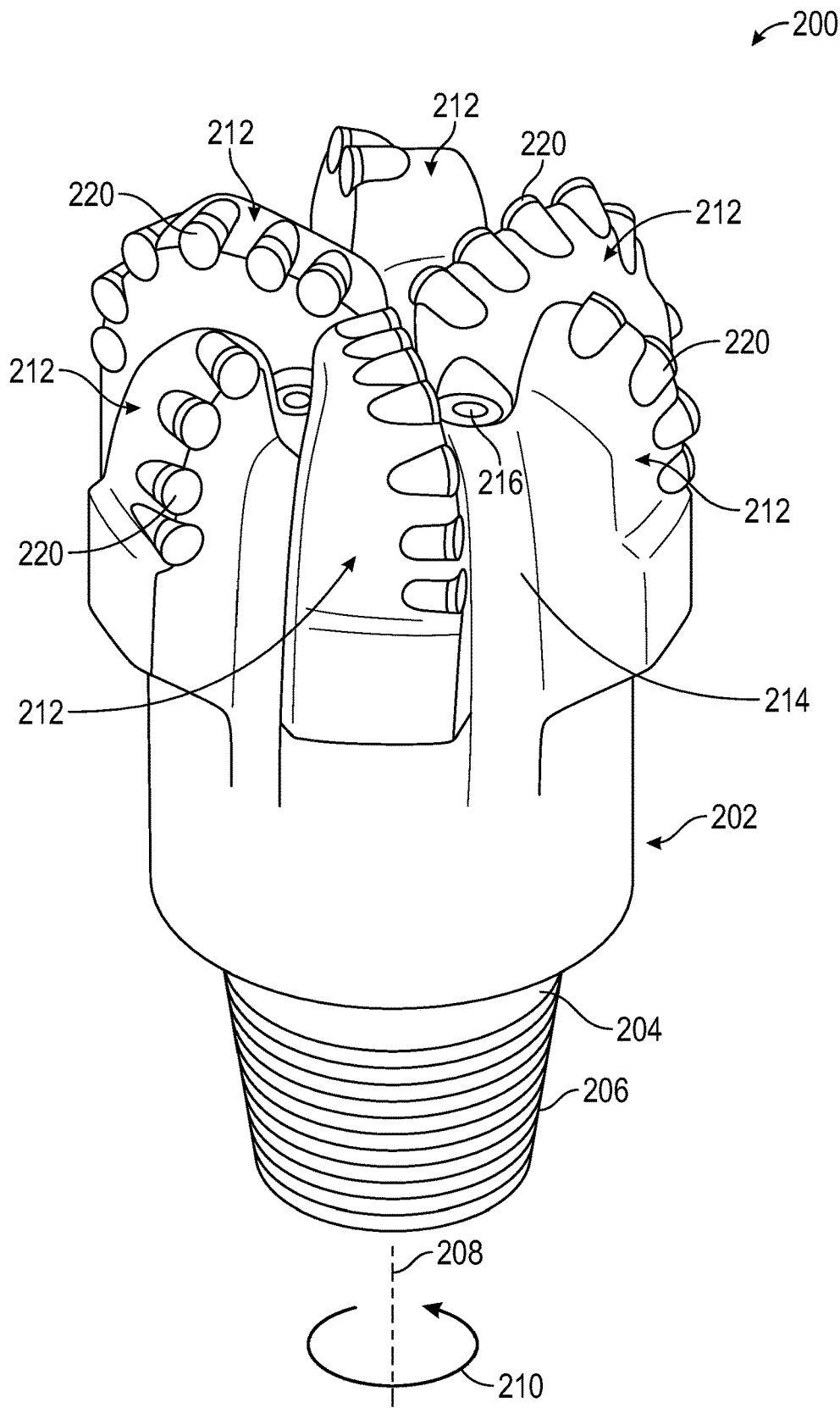
FIG. 2 shows a polycrystalline diamond compact drill bit, in accordance with one or more embodiments.

FIG. 2 shows the features of an example fixed cutter drill bit (200) fitted with PDC cutters for drilling through formations of rock formation (125) to form a borehole, in accordance with one or more embodiments. The drill bit (200) has a bit body (202) rigidly connected to a central shank (204) terminating in a threaded connection (206) for connecting the drill bit to a BHA (123) and to a drill string (115) to rotate the drill bit (200) in order to drill the borehole (116). The drill bit (200) has a central axis (208) about which the drill bit (200) rotates in the cutting direction represented by arrow (210).

In accordance with one or more embodiments, the cutting structure which is provided on the drill bit (200) includes six angularly spaced apart blades (212). In some embodiments, these blades (212) may be identical to each other, and in other embodiments these blades (212) may include a plurality of different blade types or designs. These blades (212) each project from the bit body (202) and extend radially out from the axis (210). The blades (212) are separated by channels that are sometimes referred to as junk slot (214) or flow courses. The junk slots (214) allow for the flow of drilling fluid supplied down the drill string (115) and delivered through apertures (216), which may be referred to as nozzles or ports. Flow of drilling fluid cools the PDC cutters and as the flow moves uphole, carries away the drilling cuttings from the face of the drill bit (200). Those skilled in the art will appreciate that while FIG. 2 shows six (6) blades, any suitable number of blades may be used in the cutting structure of embodiments disclosed herein.

In accordance with one or more embodiments, the blades (212) have pockets or other types of cavities which extend inwardly from open ends that face in the direction of rotation (210). PDC cutters (220) are secured by brazing in these cavities formed in the blades (212) so as to rotationally lead the blades and project from the blades, which exposes the diamond cutting faces of the PDC cutters as shown. According to one or more embodiments, the number of cutters (220) on each blade (212) may be identical; alternatively, the number of cutters (220) may be different on some blades (212) from other blades (212). Similarly, according to one or more embodiments, the position of cutters (220) on each blade (212) may be identical or may be different on some blades (212) from other blades (212).

Continuing with FIG. 2, the drill bit (200) is designed, in accordance with one or more embodiments, to increase the length of the borehole (116) by breaking the rock formation (125) below or in front of the drill bit (200). In accordance with other embodiments, the drill bit (200) may be designed to increase the diameter of a pre-existing borehole (116) by breaking the rock formation which forms the walls of the pre-existing borehole (116). This process of increasing the diameter of a pre-existing borehole (116) may be called reaming, and the drill bit (200) used for reaming may be called a reamer. Reaming may be used to enlarge a section of a hole if the hole was not drilled as large as it should have been at the outset. This can occur when a drill bit (200) has been worn down from its original size but has been undetected until the drill bit (200) and drill string (115) is removed from the borehole (116). In other cases, some rock formations (125) may slowly plastically deform into the wellbore over time, thus requiring the reaming operation to maintain the original hole size. Reamer drill bit may also have PDC cutters (220) mounted in their blades (212).

Figure 3:
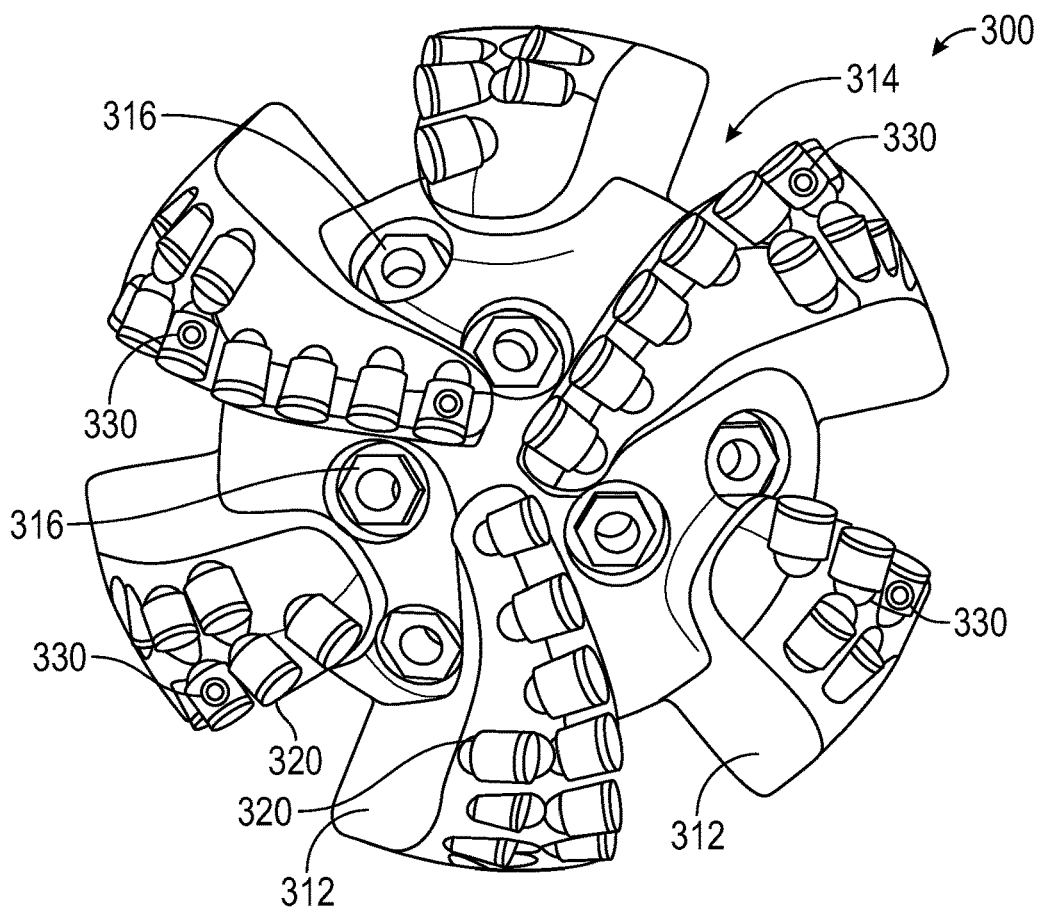
FIG. 3 shows a polycrystalline diamond compact drill bit, in accordance with one or more embodiments.

FIG. 3 shows the face of a drill bit (300), in accordance with one or more embodiments. FIG. 3 shows six nozzles (316) penetrating the body of the drill bit (300) to permit the exodus of drilling mud from the interior of the drill string (115) and the interior of the drill bit (300). FIG. 3 further shows six blades (312) of two different design, each separated by a junk slot (314). On each blade (312) a plurality of cutters (320 and 330) are mounted. As noted above, those of ordinary skill in the art will appreciate that any number of nozzles and blades may be employed by embodiments disclosed herein, without departing from the scope of this disclosure.

In accordance with one or more embodiments, at least one of the PDC cutters is an instrumented PDC cutter (330). An instrumented PDC cutter (330) differs from a non-instrumented PDC cutter (320) in that an instrumented PDC cutter (330) may contain one or more sensors to monitor the state of wear of the instrumented PDC cutters (330). The one or more sensors may be embedded sensors or systems in the PDC drill bit cutter substrate with different types of sensors that are used to measure real-time wear and dimension changes of PDC cutters and related drill bits. In accordance with some embodiments, the instrumented PDC cutters (330) may be located at key locations anticipated by the operators to be locations at which the PDC cutters (330) may experience a maximum rate of wear. In accordance with one or more embodiments, the instrumented PDC cutters (330) may be positioned at the same position on each blade (312). In accordance with other embodiments, the instrumented PDC cutters (330) may be positioned at different locations on each blade (312). In accordance with still other embodiments, all the PDC cutters (320) in drill bit (300) may be instrumented PDC cutters (330).

Figure 4:
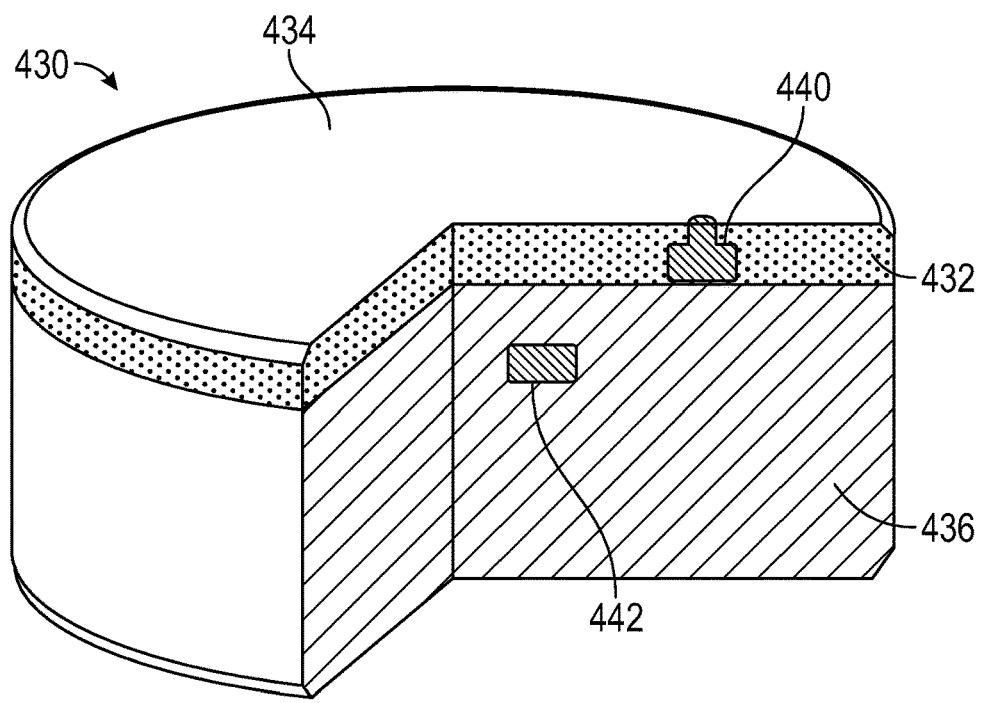
FIG. 4 shows a cutter, in accordance with one or more embodiments.

FIG. 4 depicts an instrumented PDC cutter (430) in accordance with one or more embodiment. Both instrumented PDC cutters (430) and non-instrumented PDC cutters (320) may be formed from two components. The first component, of a PDC cutter (430) is known as the PDC diamond table (432) is formed from polycrystalline diamond. PDC is an aggregate of tiny, inexpensive, manmade diamonds into relatively large, intergrown masses of randomly oriented crystals that can be formed into useful shapes. The PDC diamond table (432) forms the cutting surface (434) of the instrumented PDC cutters (430) that contacts the rock formation (125). Diamond, one of the hardest known materials, gives the cutting surface (434) of the PDC diamond tables (432) superior cutting properties. Besides their hardness, PDC diamond tables (432) have an essential characteristic for drill bit cutters. PDC diamonds efficiently bond with tungsten carbide. Tungsten carbide may be used to form a substrate (436) that can be attached to the blades (312) of a drill bit (300). The attaching of the substrate (436) to the blades (312) may be performed by brazing, a joining by soldering with an alloy of silver, copper and zinc at high temperature, wherein the high temperature may be above 840° F.

FIG. 4 further shows, in accordance with one or more embodiments, a first sensor (440) and a second sensor (442). The presence of at least one of these sensors (440, 442) distinguish an instrumented cutter (430) from a non-instrumented cutter (320). In accordance with one or more embodiment, the first sensor (440) may be embedded in the PDC diamond table (432) and may extend to the cutting surface (434), and may be configured to directly sense or remotely monitor wear of the cutting surface (434). In accordance with other embodiments, the first sensor (440) may be embedded in the PDC diamond table (432) and may not extend to the cutting surface (434), but instead may be wholly enclosed within the PDC diamond table (432), and configured to remotely sense or remotely monitor wear of the cutting surface (434).

A second sensor (442) may be embedded in the substrate (436) of the instrumented PDC cutter (430). The second sensor (442) may be configured to remotely sense or remotely monitor wear of the cutting surface (434). Although FIG. 4 shows a first sensor (440) embedded in the PDC diamond table and a second sensor (442) embedded in the substrate (436) of the instrumented PDC cutter (430) it should be understood that these are only illustrations of one of many configurations. In particular, in accordance with one or more embodiment, an instrumented PDC cutter may have only one sensor, that may be either embedded in the PDC diamond table (432) or in the substrate (436) of the instrumented PDC cutter (430). Alternatively, in accordance with other embodiments, the instrumented PDC cutter (430) may have any combination of at least one first sensor (440) embedded in the PDC diamond table (432) and at least one second sensor (442) embedded in the substrate (436) of the instrumented PDC cutter (430). Furthermore, in accordance with other embodiments each of a plurality of first sensors (440) embedded in the PDC diamond table (432) may not be identical to others of plurality of first sensors (440). In one or more embodiments, cutters with embedded sensors are selected to place in some important locations such as shoulder and cone areas of the cutter blades.

In particular, each of the plurality of first sensors (440) may use a different sensing modality. For example, one member of a plurality of first sensors (440) may be sensitive to electrical capacitance, and a second member of a plurality of first sensors (440) may be sensitive to ultrasonic propagation time. Similarly, each of the plurality of second sensors (442) may use a different sensing modality. For example, one member of a plurality of second sensors (442) may be sensitive to electrical capacitance, and a second member of a plurality of second sensors (442) may be sensitive to ultrasonic propagation time. Further a first sensor (440) embedded in the PDC diamond table (432) may use a sensing modality different from a second sensor (442) embedded in the substrate (436) of the instrumented PDC cutter (430).

The first and/or second plurality of sensors may be any suitable type of sensor such as, for example, proximity sensors, such as strain, accelerometers, ultrasonic sensors, capacitive, photoelectric, inductive, or magnetic, motion detectors such as infrared, ultrasound, or microwave/radar technology, and image sensors such as digital cameras, camera modules and other imaging devices based on CCD or CMOS technology.

Figure 5:
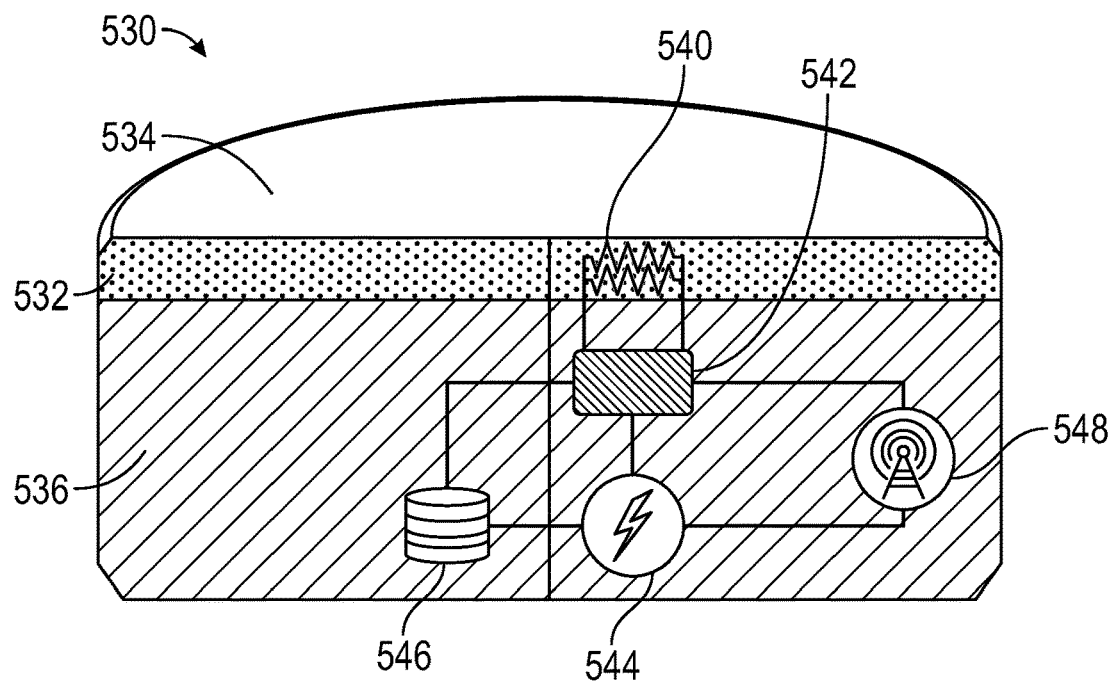
FIG. 5 shows an instrumented cutter, in accordance with one or more embodiments.

In accordance with one or more embodiments, FIG. 5 depicts an instrumented PDC cutter (510) configured to monitor the wear of the cutting surface (534) of the PDC diamond table (532) using the resistivity of a sensor (540) embedded in the PDC diamond table (532). FIG. 5 further depicts, in accordance with one or more embodiments, an electronics module (542) embedded in the substrate (536) of the instrumented PDC cutter (530) configured to monitor the resistivity of the resistivity sensor (540) and to store the resistivity values recorded by the resistivity sensor in a non-transient computer memory module (546) embedded in the substrate (536) of the instrumented PDC cutter (530).

In accordance with one or more embodiments, FIG. 5 further depicts a wireless transceiver (548) that may be embedded in the substrate (536) of the instrumented PDC cutter (530) and configured to transmit the resistivity values recorded by the resistivity sensor to a wireless telemetry transceiver mounted in the drill bit body (202), or the BHA (123). The wireless transceiver (548) may be a Wi-Fi transceiver, a Bluetooth transceiver, an induction wireless transceiver, an infrared wireless transceiver, an ultra-wideband transceiver, a ZigBee transceiver, or an ultrasonic transceiver.

FIG. 5 further depicts, in accordance with one or more embodiments, a power supply (544) to provide power to at least one of the non-transient computer memory module (546), the electronics module (542), the wireless transceiver (548), and the first sensor (540). The power supply (544) may be a battery, or an energy harvesting device that converts vibration to electrical power, or a terminal electrically connect to a power supply (not illustrated) located in the drill bit (200), or located in the BHA (123).

Although FIG. 5 shows a single first sensor (540), in accordance with one or more embodiments, this is intended to in no way limit the scope of the invention. It will be obvious to one of ordinary skill in the art that the instrumented PDC cutter may, in other embodiments have a plurality of sensors, that may share one or more of a single power supply (544), a non-transient computer memory module (546), an electronics module (542) and a wireless transceiver (548). Alternatively, each of a plurality of sensors may each be configured with their individual power supply (544), a non-transient computer memory module (546), an electronics module (542) and a wireless transceiver (548).

Figure 6:
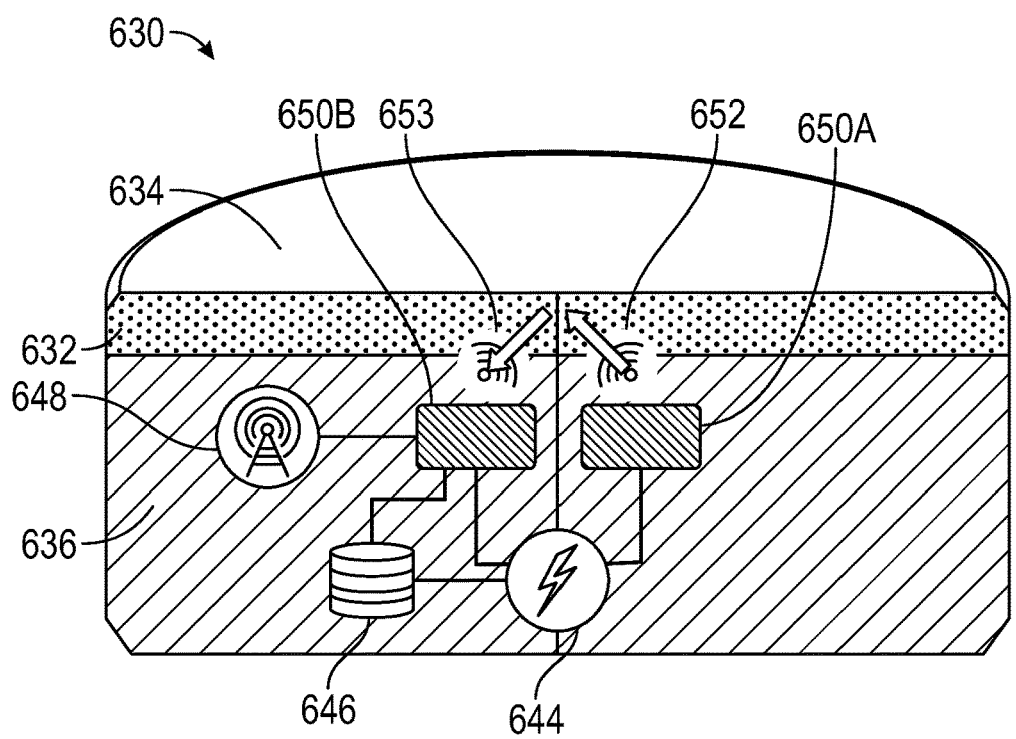
FIG. 6 shows an instrumented cutter, in accordance with one or more embodiments.

FIG. 6 depicts, in accordance with one or more embodiments, an example of remote sensing sensors (650A, 650B) embedded in an instrumented PDC cutter (630). According to one or more embodiments, the remote sensing sensor (650A) may be an ultrasonic transceiver that emits an ultrasonic wave (652). The ultrasonic wave (652) may be reflected by the cutting surface (634) of the PDC diamond table (632) and the reflected ultrasonic wave (653) may be detected by an ultrasonic transceiver (653). In accordance with one or more embodiment, the wear of the cutting surface (634) or the instrumented PDC cutter (630) may be determined from the travel time of the reflected ultrasonic wave (652). In accordance with other embodiments, the wear of the cutting surface (634) of the instrumented PDC cutter (630) may be determined from the amplitude of the reflected ultrasonic wave (653). In accordance with further embodiments, the wear of the cutting surface (634) of the instrumented PDC cutter (630) may be determined from the spectrum of the reflected ultrasonic wave (653). In accordance with still further embodiments, the wear of the cutting surface (634) of the instrumented PDC cutter (630) may be determined from a combination of at least one of the travel time, the amplitude, and the spectrum of the reflected ultrasonic wave (653). In accordance with one or more embodiments, the ultrasonic transceiver (650A) emitting the ultrasonic wave (652) and the ultrasonic transceiver (650B) receiving the reflected ultrasonic wave (653) may be one single transceiver performing both the emission and the reception of ultrasonic waves.

Just as the resistivity sensor (540) shown in FIG. 5 may be equipped with a power supply (544), a non-transient computer memory module (546), an electronics module (542) and a wireless transceiver (548) similarly the ultrasonic sensor (650A, 650B) shown in FIG. 6 may, in accordance with one or more embodiments, be equipped with a power supply (644), a non-transient computer memory module (646), and a wireless transceiver (648). One or more of the ultrasonic sensors (650A, 650B), power supply (644), non-transient computer memory module (646), and wireless transceiver (648) may be embedded in the cutter substrate (636).

Before the instrumented PDC cutter is used to predict drill bit performance metrics, the instrumented PDC cutter (330) is inserted into at least one blade (312) of a drill bit (300). The instrumented PDC cutter (430) may include at least one sensor (440, 442), that may be configured to monitor the wear of the cutting surface (434) of the instrumented PDC cutter (430). In accordance with other embodiments, each blade (312) may be equipped with a plurality of instrumented cutters (430). The instrumented PDC cutter (430) may be differ in design from one another and may use different physical sensing modalities. The drill bit (300) and BHA (123) may be inserted into a borehole (116) attached to a drill string (115) extending from the BHA (123) to a drilling rig (102). The drill string (115) may include a plurality of joints of drill pipe, a plurality of joints of wired drill pipe, or a coiled tubing, in accordance with one or more embodiments. The insertion of the drill bit (300), BHA (123), and drill string (115) may comprise suspending the drill bit (300), BHA (123), and drill string (115) from the drilling rig (102).

In accordance with one or more embodiments, the size of the borehole (116) may be increased by rotation of the drill bit (300). The rotation of the drill bit (300) may be caused by the rotation of the drill string (115) that is, in turn, caused by the rotation of equipment on the drilling rig (102). In accordance with other embodiments, the rotation of the drill bit (300) may be caused by the rotation of a mud-motor, or electrical motor mounted in the BHA (123). The size of the borehole increases, at least in part, by the abrasion of one or more instrumented PDC cutters (430) against the rock formation (125). In accordance with one or more embodiments, the increase in size of the borehole (116) may be an increase in the length of the borehole (116). In accordance with other embodiments, the increase in size of the borehole (116) may be an increase in the diameter of the borehole (116) or may be a simultaneous increase in both the length and the diameter of the borehole (116).

At this stage, at least one measurement may be made of the wear of the cutting surface (434) of an instrumented PDC cutter (430) by at least one sensor (440, 442) embedded in the PDC diamond table (432), or the substrate (436) of the instrumented PDC cutter (430). The measurement may be based upon the following without limitation, a strain, an acceleration, a motion, a vibration, an image, an electrical resistance, an electrical capacitance, an electrical inductance, a magnetic field, and a photoelectric emission, alone or in combination with one another.

Transmission of at least one measurement from the instrumented PDC cutter (430) to the BHA (123) may be performed using at least one wireless transceiver selected from the group composed of a Wi-Fi transceiver, a Bluetooth transceiver, an induction wireless transceiver, an infrared wireless transceiver, an ultra-wideband transceiver, a ZigBee transceiver, or an ultrasonic transceiver, and from the BHA to the drilling rig. Further, at least one measurement may be transmitted from the BHA (123) to the drilling rig (102). The transmission of at least one measurement may be performed using mud-pulse telemetry, wired drill pipe telemetry, wired coiled tubing telemetry, or electromagnetic induction telemetry.

In accordance with one or more embodiments, at least one drilling parameter may be modified based, at least in part, on at least one measurement from the instrumented PDC cutter (430). The modified drilling parameter(s) may include, without limitation, a weight on bit (WOB), a drilling direction, a mud weight, torque on bit, and many other drilling parameters. The modification of one or more drilling parameters may be performed in real-time. The modification may be commanded by an operator based, at least in part, on inspection of the measurement and/or change in the measurement. The modification may be commanded or performed by a drilling automation algorithm based, at least in part, on the measurement and/or a change in the measurement. The measurement may further allow the operator to determine the grade of the PDC cutter and the bit composed of a plurality of cutters, including how "dull" or worn are the plurality of PDC cutters.

The modification of drilling parameters may include the time at which it is optimal to replace the bit, including the retraction of the drill string (115), the BHA (123), and the drill bit (124) from the borehole (102), the replacements if the drill bit (124) with a new and unworn drill bit (124), and the insertion of the drill string (115), the BHA (123), and the drill bit (124) into the borehole (102).

In accordance with one or more embodiments, at least one measurement may be stored in the non-transient computer memory module (546, 646) embedded in the instrumented PDC cutter (530, 630). The non-transient computer memory module (546, 646) may be read when the drill bit (300), BHA (123) and drill string (115) is retracted from the borehole (102). In accordance with other embodiments, the modified parameter may be a parameter describing the design of a drilling bit (300), or the design of a PDC cutter (320). In accordance with other embodiments, the modified parameters may be control parameters in drilling automation algorithms which perform the automatic control of drilling parameters and predict the current and future performance of the drill bit (300).

Figure 7:
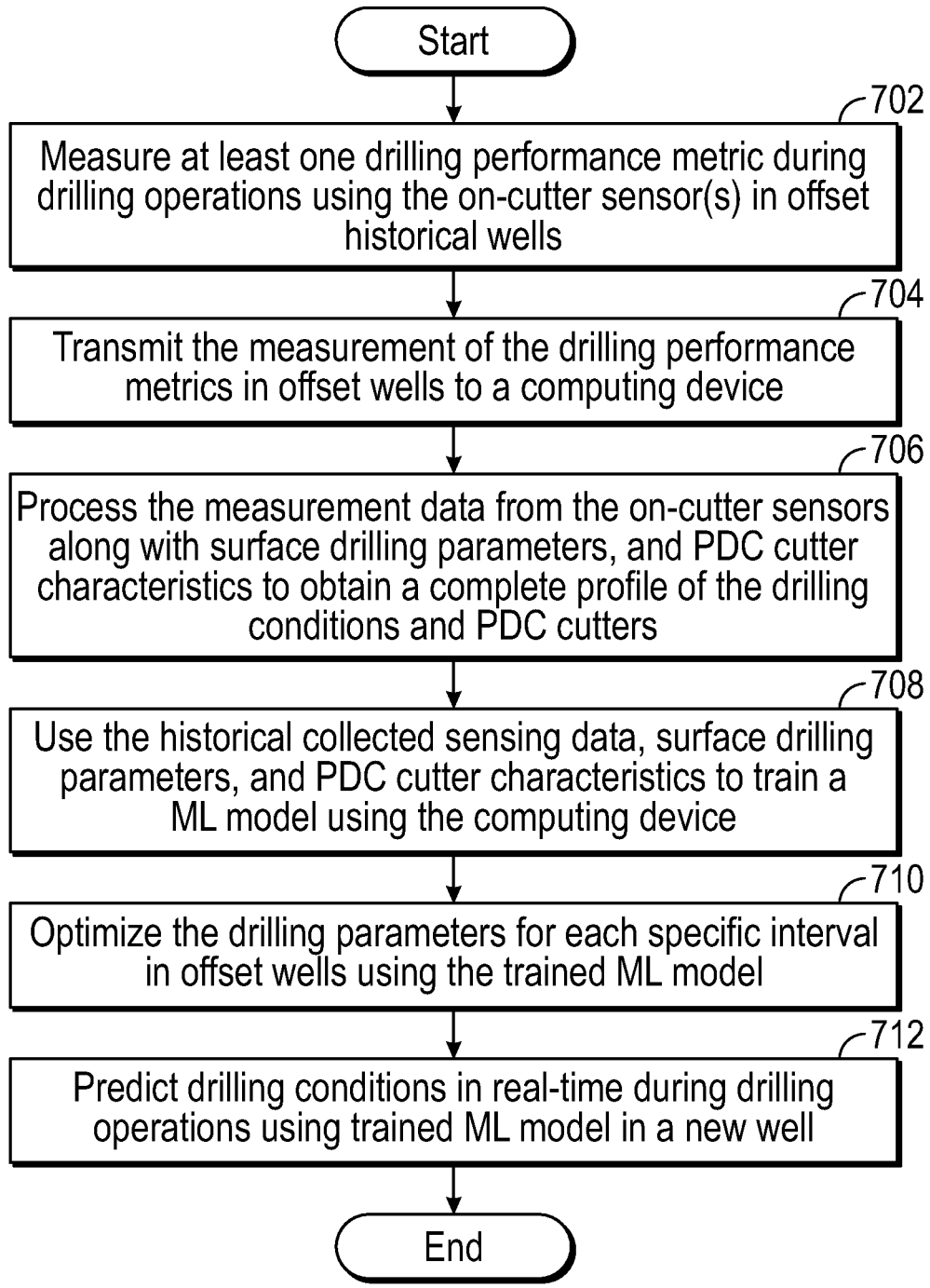
FIG. 7 shows a flowchart, in accordance with one or more embodiments.

The above steps illustrate how an instrumented PDC cutter may be used to guide and/or predict drilling parameters/conditions during drilling operations based on offset wells data. Following this method, a method for integrating the on-cutter sensing data collected by the instrumented PDC cutter and processing the integrated data to train ML/DL models is performed. FIG. 7 depicts a flowchart for predicting drill bit performance in offset wells, in accordance with one or more embodiments. One or more blocks of FIG. 7 may be performed using one or more components as described in FIGS. 1 through 6. While the various blocks in FIG. 7 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 702, at least one drilling performance metrics is measured during drilling operations in a historical offset well. The drilling performance metrics may be measured by sensors in the BHA and/or by the on-cutter sensor on the PDC cutter. The drilling performance metrics measured may include, but are not limited to, a strain, an acceleration, a motion, a vibration, an image, an electrical resistance, an electrical capacitance, an electrical inductance, a magnetic field, and a photoelectric emission, pressure, temperature, etc. Further, the on-cutter sensor of the PDC cutter may directly measure wear of the cutter, for example. Thus, drilling performance metrics as used herein may be equivalent to data measured by BHA sensors and/or on-cutter sensing data that is captured by the instrumented PDC cutter on the drill bit while performing drilling operations. In one or more embodiments, Block 702 may be used to collect historical offset well data, over specific intervals of time, which may be used at a later stage to train a machine learning (ML) model.

In Block 704, the drilling performance metrics are transmitted to a computing device on the surface. The drilling performance metrics may be transmitted via wired drill pipe, mud pulses, or wireless hubs. For example, in one or more embodiments, the drilling performance metrics may be transmitted using the wireless transmission capabilities of the instrumented PDC cutter described in FIG. 5 above. The drilling performance metrics may be stored in the instrumented PDC cutter, or in the bottomhole assembly, prior to transmission, or the data may be transmitted immediately, in real-time. The computing device on the surface may be one such as that shown in FIG. 9 and discussed below.

In Block 706, the drilling performance metrics (including on-cutter sensing data) are processed by software executing on the computing device. In one or more embodiments, the data that is processed along with the drilling performance metrics includes surface drilling parameters (torque, RPM, SPP, WOB, etc.) and PDC cutter characteristics (PDC cutters and substrates). Processing the data may involve aggregating the data from different on-cutter PDC sensors, synchronizing the data, and transforming the data (e.g., using Fourier transforms) to remove noise.

In Block 708, the processed data is used to train a ML/DL model. Training a model involves finding relationships between directly controlled parameters (i.e., RPM, WOB, mud-density and mud flow rate, and change of direction if you are steering and indirectly controlled parameters (i.e., rate of penetration (ROP), Torque on bit (TOB), how fast the cutters wear, bearing temperature, vibration, bit whorl, etc.). It's geology specific (because the rock parameters affect indirectly controlled parameters too). Training ML models uses data from offset wells (optimally in the same geology) to link cutter-sensor data (e.g. cutter wear) to drilling performance (e.g. rate of penetration "ROP"). In addition, in one or more embodiments, cutter-wear is measured directly and in real-time, data from earlier in a current may also be used to train/retrain/refine the model development or artificial intelligence framework. Thus, in Block 708, the processed historical offset well sensing data/drilling performance metrics, the surface drilling parameters, and the PDC cutter characteristics are fed into a model development system which hosts a plurality of ML/DL models and the data is used to train an ML/DL model to recognize, e.g., when a drill bit needs replacement, temperatures at which the drill bit performs optimally, vibrational contributions to drill bit wear, and any other suitable drill bit performance metric. The historical offset well data, surface drilling parameters, and PDC cutter characteristics are used as input to the ML/DL model, which may be trained using labelled datasets (supervised ML) or unlabelled datasets (unsupervised ML). Further description of the model development system and the types of ML/DL algorithms that may be employed is found in FIG. 8 below.

Continuing with FIG. 7, in Block 710, the trained ML model is used to optimize drilling parameters for specific intervals in current or new wells during drilling operations. Operations using the trained AI framework allows prediction of future performance. For example, perhaps with a little lower WOB and a little lower RPM, the ROP may fall slightly; however, the cutter-wear rate will decrease drastically and the time before an operator has to pull-out and replace the bit (a v. time-consuming operation) may be doubled or may allow reaching the casing at which point the drill string/bit is pulled out of the wellbore anyway. That is, adjustments are made to the surface drilling parameters by the computing device to optimize the drilling process, such as adjustment of revolutions per minute (RPM), WOB, drilling mud rate, etc. to reduce wear on the drill bit or optimize the life of the drill bit.

In one or more embodiments, while the above is performed on historical offset wells that are geographically proximal to new wells that are drilled for production of oil and gas, in Block 712, the trained ML/DL model(s) and the optimized surface drilling parameters obtained on historical offset wells or current wells is used to predict drilling conditions and performance in real-time of a current or future well that is or may be drilled in the same geographical region or to produce fluid from the same or similar formation/reservoir.

Figure 8:
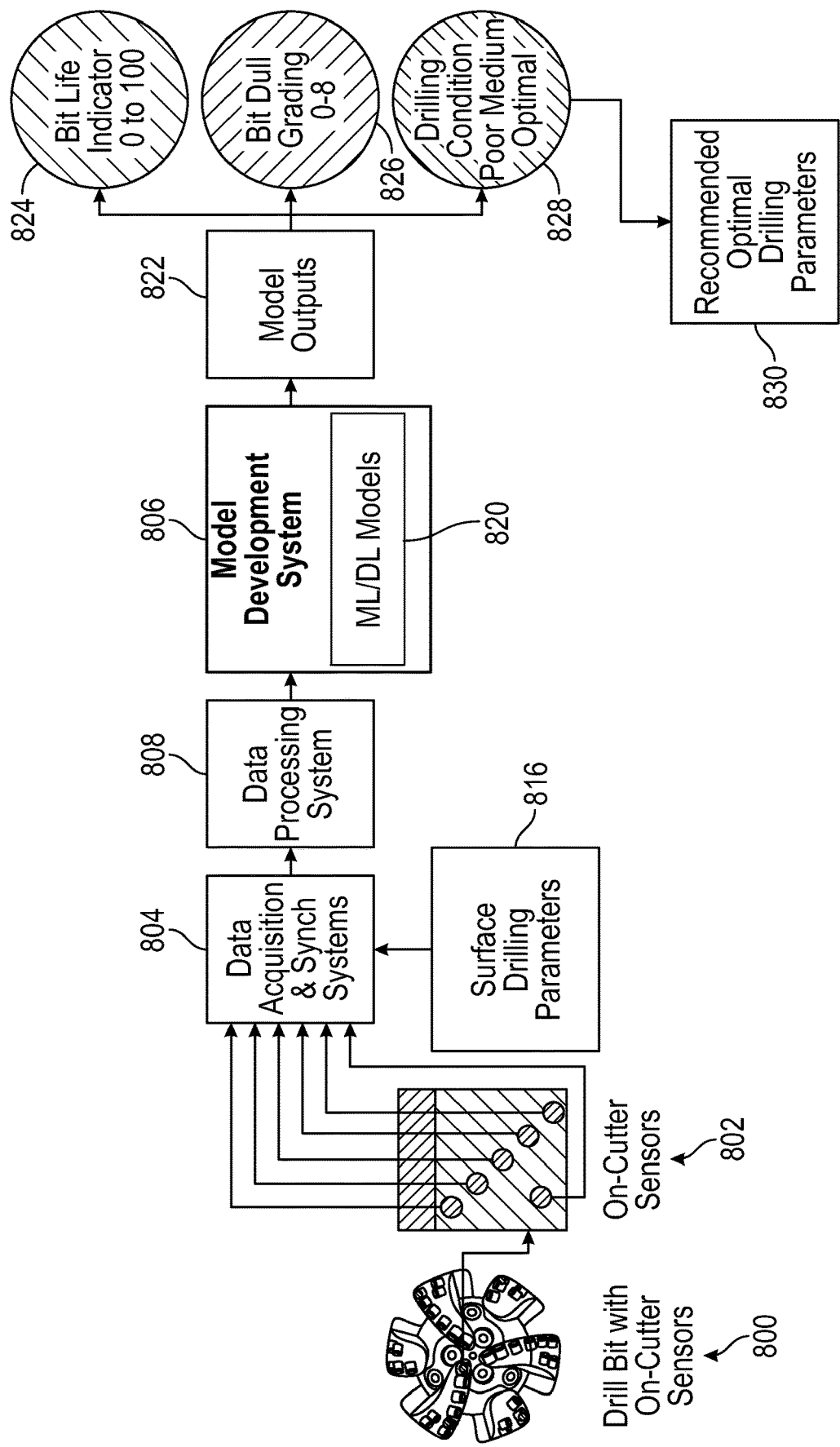
FIG. 8 shows an example flow diagram in accordance with one or more embodiments.

Although sensors are devices that get signals, AI/ML algorithms make it possible for these hardware devices to be "conscious" and "intelligent." These computational models are capable of handling large amounts of data for real-time correlation between wear, impact toughness, load, and temperature of PDC cutting elements during drilling. FIG. 8 shows an example flow diagram that implements the method of FIG. 7. In one or more embodiments, the flow diagram of FIG. 8 depicts the integration of sensing data collected from the BHA sensors and/or on-cutter sensors (802) for similar time intervals in offset historical wells as a training set for deriving artificial intelligence models, including machine-learning (ML) and deep-learning (DL) models, to predict drill bit performance, bit dull grade, and bit life.

FIG. 8 shows the drill bit (800) with on-cutter sensors (802). The data collected by the on-cutter sensors (802) includes measurement of drilling conditions such as real-time wear and dimension changes of PDC cutters and related drill bits. The measurements made by the on-cutter sensors are aggregated and synchronized by the data acquisition system (804), and thereafter are processed by the data processing system (808). Aggregation of the data may involve aggregating data across the multiple cutter sensors on each PDC cutter, and also aggregating on-cutter sensor data with other drilling performance parameters measured directly or indirectly by the sensors on the BHA. Although a single combined data acquisition system (804) in shown in FIG. 8, those skilled in the art will appreciate that each type of on-cutter sensor (802) configured to measure a different drilling parameter/condition may send measurement data to a corresponding specialized acquisition system.

For example, there may be a geophysical data acquisition system for rock properties, an acoustic emissions data acquisition system that collects acoustic emission data, a load acquisition system for drill bit load measurements, a temperature data acquisition system for drill bit/PDC cutter temperature measurements, a vibration data acquisition system for vibrational measurements of the drill bit or PDC cutters, an accelerator data acquisition system, or any other suitable data acquisition system for any other data measured by the on-cutter sensors (802) directly connected to the drill bit (800). In addition, surface drilling parameters (816) are also fed into the acquisition system (804). Surface drilling parameters may include WOB, RPM, torque, SPP, etc. In one or more embodiments, the on-cutter sensor measurements are correlated with surface drilling parameters by the data acquisition system (804).

The data processing system (808) is configured to receive the aggregated and synchronized data from the data acquisition system (804). In one or more embodiments, the data processing system (808) normalizes the received data using, for example, Z-score, min-max ranges, or any other suitable algorithm, and performs a series of data transformations, such as wavelet transform, Fourier transform, etc., to discriminate the valuable signals from background noises, and to separate the signals of one source from the others. Data domain transformations (e.g., Fast Fourier Transform) are used to process data in order to discriminate the relevant signals from noises, and to identify relevant signals to increase ML model performance. The characteristics of the PDC cutters are used in combination with temperature, load, vibration, and wear resistance to provide a complete representation of the properties of the PDC cutter cutting elements (i.e., diamond table) during drilling operations.

Continuing with FIG. 8, the transformed data from 808 is then fed to the model development system (806) to derive one or an ensemble of machine learning (ML)/deep learning (DL) models (820). That is, the selected ML/DL algorithm is trained using the transformed data, which includes the on-cutter sensing data, historical surface drilling parameters, and PDC cutter characteristics. The model development system (806) may be or executes on a computing device such as that shown in FIG. 9 and discussed below. The model development system (806) include a repository of ML/DL models that may be used separately or in conjunction to create output models (822) for predicting drill bit performance.

Specifically, different shallow ML models or DL models (820) may be used to perform the classification problem, such as random forest, decision trees, support vector machines, convolutional neural networks, including models for time series analysis (i.e., recurrent neural networks, long short term memory networks), deep neural networks, inductive learning models, deductive learning models, supervised learning models, among others. In some embodiments, the model development system (806) may generate augmented or synthetic data to produce a large amount of interpreted data for training a particular ML model.

The outputs of the model development system (806) may be one or a plurality of ML models (822) configured to predict various offset well bit performance metrics. Thus, the model development system (806) uses one or more ML/DL algorithms as mentioned above to produce at least one trained ML output model (822) for predicting a specific feature of the drill bit/PDC cutter. For example, in one or more embodiments, the model development system (806) takes as input the processed historical offset on-cutter integrated sensing data (802), surface drilling parameters (816), and PDC cutter characteristic data to build one or more performance models that predict performance metrics of the drill bit, bit life models that predict the life of the drill bit before it needs replacement, and/or bit dull grading models that predict damage to specific features of the drill bit.

Those skilled in the art will appreciate that the model development system (806) may use ML/DL to develop trained models for characterizing or predicting any drilling parameter or drilling condition, now known or later developed, and that embodiments disclosed herein are not limited to the example output models given above.

More specifically, continuing with FIG. 8, the ML output models (822) use the aggregated data (on-cutter sensors, surface drilling parameters, as well as all cuttings characteristics) from historical offset wells and aim to predict, in real-time, drill bit performance metrics in current or new/future wells. These drill bit performance metrics may be, for example bit dull grading (826) prediction (i.e., value between 0-8), which provides confidence on correlating damage reduction to specific bit features and iterative improvements. Further, the drill bit performance metrics may include optimization of drilling condition (828) (i.e., poor, medium, optimal), which provides the ability to predict a bit grade while below rotary that will help tailor drilling automation algorithms to optimize drilling performance based on current bit condition (not assumption of peak performance). In one or more embodiments, bit life (824) (e.g., a value between 0-100), which is the ability to reliably predict bit grade that informs geoscientists and drilling operators when it is more economic to simply trip the bit out of the hole and replace it with a new bit instead of continuing to drill with low ROP due to accumulated damage may also be predicted by the output ML models (822).

Further, the output ML models (822) may be used to guide the correct grade selection of the cutting element in current or new wells for drill bit design and downhole application. Prediction of bit performance metrics by the output ML models (822) results in full automation/digitization of PDC cutter cutting elements to predict bit performance, bit dull grading and bit life (824-828) to achieve optimized drilling operation parameters for current or future wells.

Additionally, the in-situ property information of the PDC cutter cutting elements and substrates is also used for optimizing the drilling parameters for specific intervals in current or future wells (i.e., new wells that are not offset wells supplying the historical drilling performance metric data). These results provide further guidance for the offset well optimization of the drilling process (830), such as adjustment of revolutions per minute (RPM), weight on bit (WOB), and drilling mud rate (GPM). The effect of operating parameters on the failure mode is obtained by displaying the impact-dominated cutter failure mode or the wear resistance-led cutter failure mode. By optimizing these operating parameters (830), prediction and optimization of the drilling parameters for offset wells, such as cutter grade selection, drill bits design, revolutions per minute (RPM), weight on bit (WOB), and cooling effects by adjusting the downhole drilling mud rate, may be performed.

Embodiments disclosed herein provide a model development system that employs machine learning/deep learning algorithms trained by sensing data collected by on-cutter sensors directly connected to the drill bit. In addition, the ML/DL models are fed surface drilling parameters data and PDC cutter characteristic data to provide a complete picture of the PDC cutters used for drilling operations. The ML/DL models based on on-cutter sensing data, surface drilling parameters, and PDC cutters characteristics, considerably enhances the performance of drilling operations by 1) guiding drilling practices, 2) optimizing trip plans, 3) enhancing bit design, and 4) enabling drilling automation.

Figure 9:
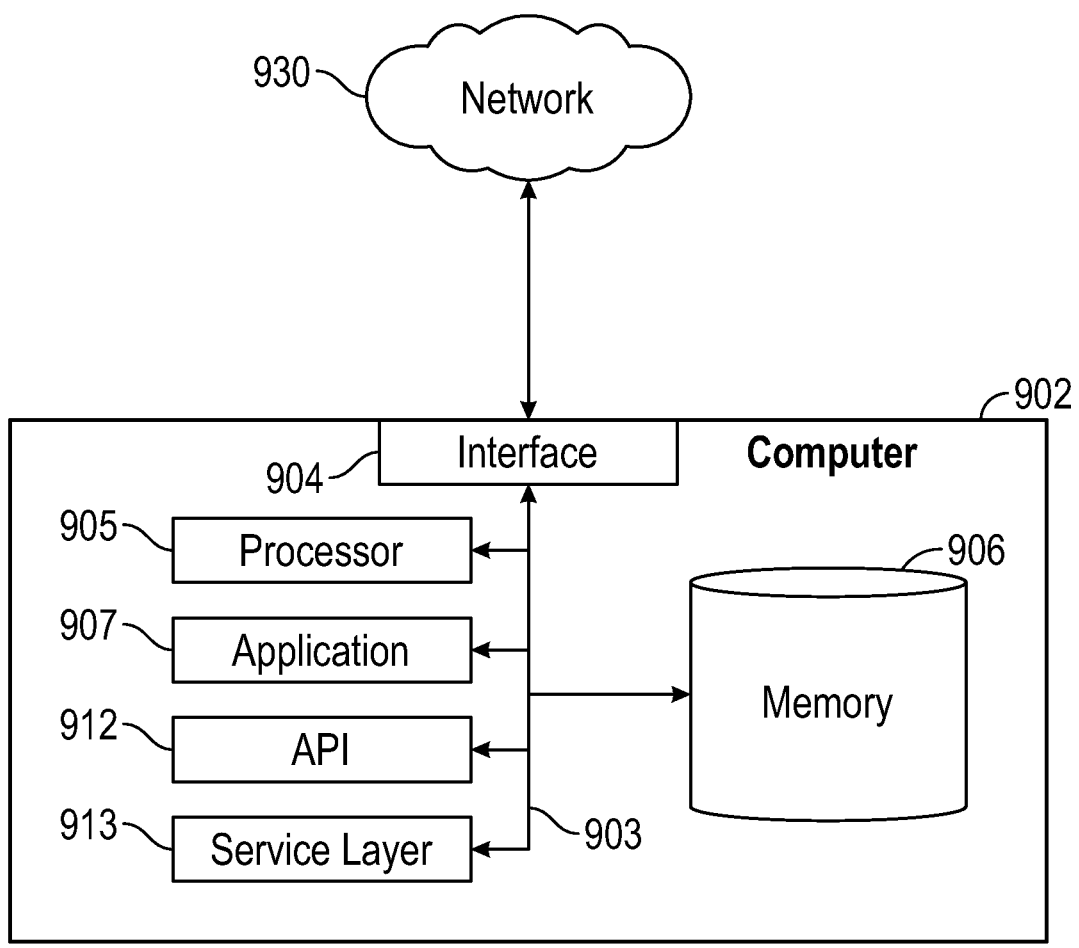
FIG. 9 shows a computing device in accordance with one or more embodiments.

Embodiments may be implemented on a computing device. FIG. 9 is a block diagram of a computing device (902) used to provide computational functionalities associated with described algorithms, methods, functions, processes, flows, and procedures as described in the instant disclosure, according to an implementation. For example, the ML/DL algorithms for the artificial intelligence model that is used to optimize and predict PDC cutter wear and properties in real-time may be implemented on such a computing device (902). The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A system comprising:
   an instrumented cutter of a drill bit comprising an on-cutter sensor for monitoring drilling performance metrics while performing drilling operations based on offset well data; and
   a computing device comprising a model development system configured to use the drilling performance metrics, surface drilling parameters, and characteristics of the instrumented cutter to train a machine learning (ML) model,
   wherein the trained ML model is used to optimize drilling parameters and predict drill bit performance in a current well,
   wherein the on-cutter sensor is at least one ultrasonic transducer for measuring wear of a polycrystalline diamond table, by exciting the polycrystalline diamond table with an ultrasonic pulse and recording an ultrasonic vibration of the polycrystalline diamond table.

2. The system of claim 1, wherein the ML model is a deep learning (DL) machine learning model.

3. The system of claim 1, wherein the instrumented cutter comprises a plurality of on-cutter sensors for monitoring cutter wear.

4. The system of claim 3, wherein the computing device further comprises a data processing module configured to aggregate the drilling performance metrics measured by the plurality of on-cutter sensors and transform the processed data to remove noise.

5. The system of claim 1, wherein the drilling performance metrics comprise at least one selected from the group consisting of a strain, an acceleration, a motion, a vibration, an image, an electrical resistance, a temperature, a pressure, an electrical capacitance, an electrical inductance, a magnetic field, and a photoelectric emission.

6. The system of claim 1, wherein the instrumented cutter comprises a wireless transmitter configured to transmit the drilling performance parameters to the computing device.

7. The system of claim 1, wherein surface drilling parameters that are optimized using the ML model comprise a weight on bit, a rotational speed, a torque on bit, a downhole mud pressure, and a downhole mud flow rate.

8. A method, comprising:
measuring drilling performance metrics while performing drilling operations in an offset well using an instrumented cutter of a drill bit comprising an on-cutter sensor;
transmitting the drilling performance metrics to a computing device;
training a machine learning (ML) model hosted by the computing device using processed drilling performance metrics, surface drilling parameters, and characteristics of the instrumented cutter to obtain a trained ML model;
using the trained ML model to optimize the surface drilling parameters and predict drill bit performance while performing drilling operations in a current well;
processing the drill performance metrics, surface drilling parameters, and the characteristics of the instrumented cutter by:
aggregating drill performance metrics from a plurality of on-cutter sensors of the instrumented cutter; and
transforming the drill performance metrics, the surface drilling parameters, and characteristics of the instrumented cutter to remove noise using a Fast Fourier Transform.

9. The method of claim 8, wherein the ML model is a deep learning (DL) machine learning model.

10. The method of claim 8, wherein surface drilling parameters that are optimized using the ML model comprise a weight on bit, a rotational speed, a torque on bit, a downhole mud pressure, and a downhole mud flow rate.

11. The method of claim 8, further comprising: using the trained ML model to predict drill bit performance on a new well in geographical proximity to the offset well.

12. The method of claim 8, wherein the instrumented cutter comprises a wireless transmitter configured to wirelessly transmit the drilling performance parameters to the computing device.

13. The method of claim 8, wherein the drilling performance metrics measured comprise at least one selected from the group consisting of a strain, an acceleration, a motion, a vibration, an image, an electrical resistance, a temperature, a pressure, an electrical capacitance, an electrical inductance, a magnetic field, and a photoelectric emission.

14. A non-transitory computer readable medium comprising software instructions, that when executed, perform a method comprising:
measuring drilling performance metrics while performing drilling operations in an offset well using an instrumented cutter of a drill bit comprising an on-cutter sensor;
transmitting the drilling performance metrics to a computing device;
training a machine learning (ML) model hosted by the computing device using processed drilling performance metrics, surface drilling parameters, and characteristics of the instrumented cutter to obtain a trained ML model;
using the trained ML model to optimize the surface drilling parameters and predict drill bit performance while performing drilling operations in the offset well, and
processing the drill performance metrics, surface drilling parameters, and the characteristics of the instrumented cutter by:
aggregating drill performance metrics from a plurality of on-cutter sensors of the instrumented cutter; and
transforming the drill performance metrics, the surface drilling parameters, and characteristics of the instrumented cutter to remove noise using a Fast Fourier Transform.

* * * * *